United States Patent [19]
Yamazaki et al.

[11] Patent Number: 5,442,692
[45] Date of Patent: Aug. 15, 1995

[54] TELECOMMUNICATION SYSTEM HAVING A CAPABILITY OF CHANGING THE ALERTING TONE

[75] Inventors: Yuki Yamazaki; Koji Tasaki, both of Kawasaki, Japan

[73] Assignee: Fujitsu Limited, Kanagawa, Japan

[21] Appl. No.: 949,097

[22] Filed: Sep. 21, 1992

[30] Foreign Application Priority Data

Sep. 20, 1991 [JP] Japan .................. 3-268904

[51] Int. Cl.6 .................. H04M 3/02; H04M 13/00; H04M 3/42
[52] U.S. Cl. .................. 379/253; 379/127; 379/179; 379/201; 379/375
[58] Field of Search .................. 379/127, 142, 179, 198, 379/201, 207, 251, 252, 253, 372, 373, 374, 375, 196, 197

[56] References Cited

U.S. PATENT DOCUMENTS

| 4,277,649 | 7/1981 | Sheinbein | 379/246 X |
| 5,119,415 | 6/1992 | Aoyama | 379/230 X |
| 5,247,571 | 9/1993 | Kay et al. | 379/230 X |

FOREIGN PATENT DOCUMENTS

| 61-288541 | 12/1986 | Japan | 379/253 |
| 63-74354 | 4/1988 | Japan | 379/253 |

*Primary Examiner*—James L. Dwyer
*Assistant Examiner*—Harry S. Hong

[57] ABSTRACT

A telecommunication system comprises a network for transmitting information, a plurality of terminals connected to the network for communicating to each other, a data base provided in the network and having a plurality of storage areas corresponding to the plurality of terminals for storing a plurality of alerting patterns, alerting tone selector for reading, on the basis of information for identifying a calling terminal, an alerting pattern specified at the calling terminal when there is a call incoming from the calling terminal to a called terminal, from a storage area in the data base corresponding to the called terminal, and alerting tone controller for controlling a called terminal on the basis of the alerting pattern and generating a corresponding alerting tone at the called terminal when there is an incoming call.

16 Claims, 24 Drawing Sheets

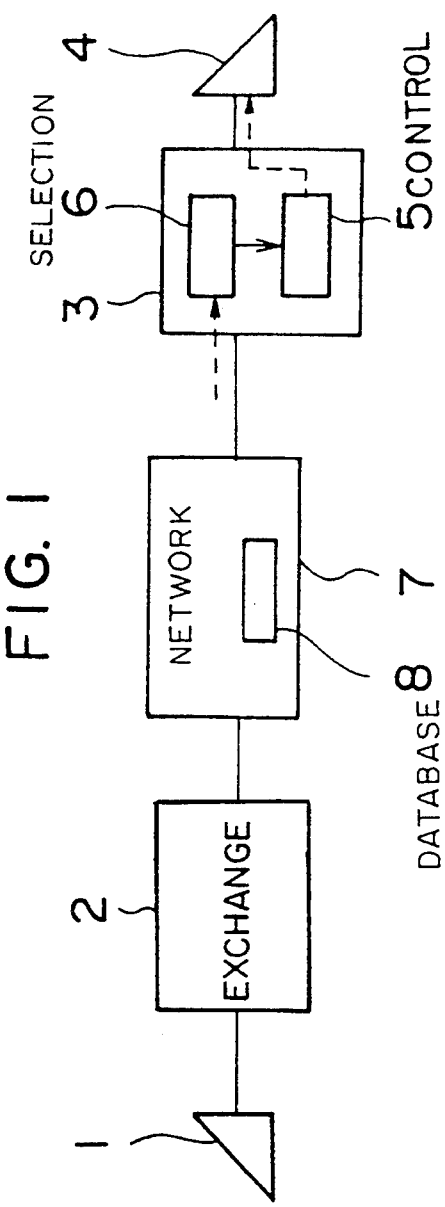

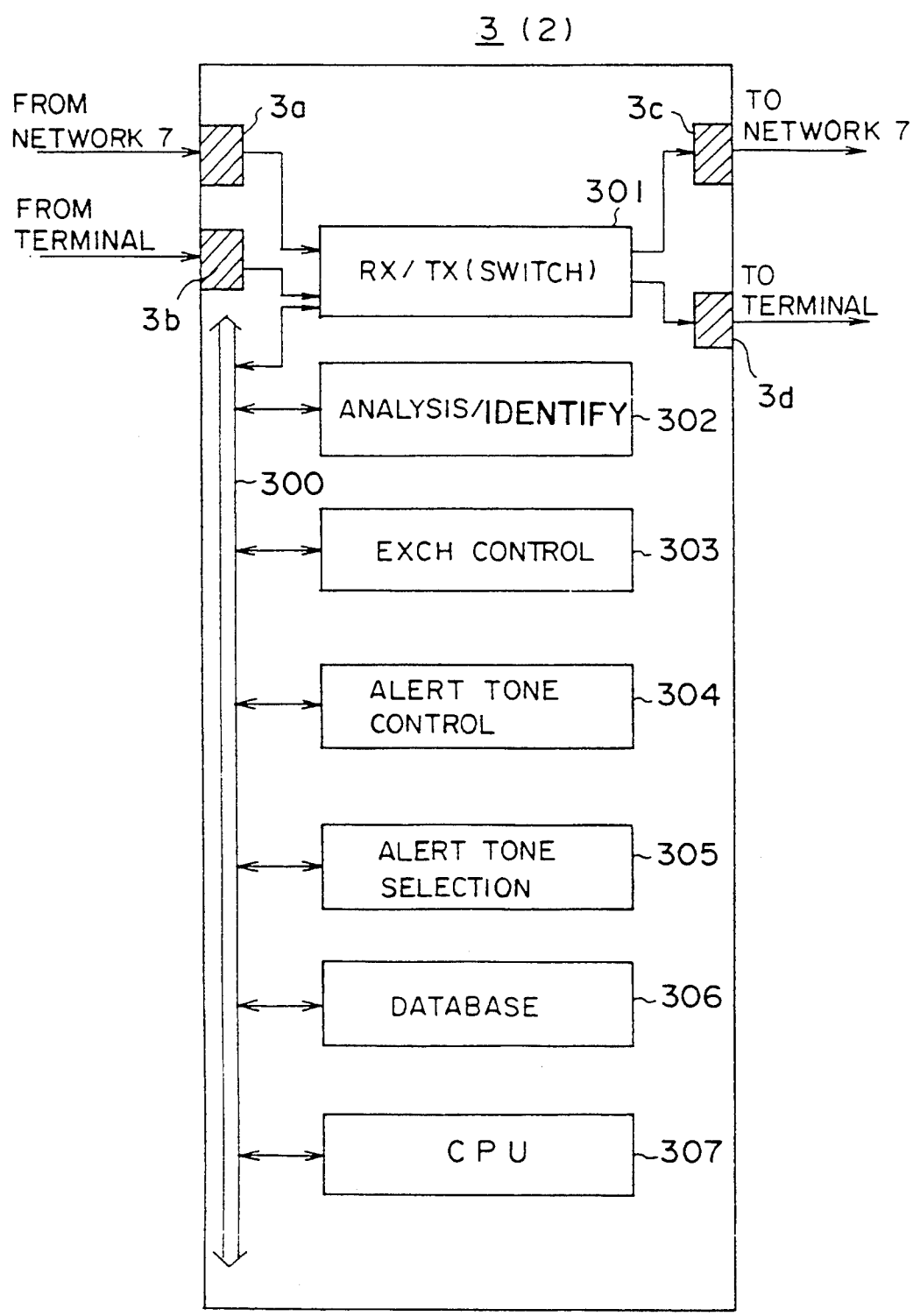

FIG. 4

| | |
|---|---|
| TONE # 1 | 1 1 0 0 0 0 1 1 0 0 0 0 - - - - - |
| TONE # 2 | 1 1 0 0 1 1 0 0 1 1 0 0 - - - - - |
| TONE # 3 | 1 0 1 0 1 0 1 0 1 0 1 0 - - - - - |

FIG. 11

TELECOMMUNICATION SYSTEM HAVING A CAPABILITY OF CHANGING THE ALERTING TONE

BACKGROUND OF THE INVENTION

The present invention generally relates to telecommunication systems, and more particularly to a telecommunication system that can change the alerting pattern at a called terminal.

In the telecommunication systems that establish a line connection between terminals via a network, the incoming of a call is notified to the user at the called terminal by activating an alerting tone. In such a telecommunication system, there is a demand for the capability of changing the alerting tone depending on the terminal or the user from which the call has been issued such that the user at the called terminal can identify the calling terminal based upon the alerting pattern thus activated.

In order to meet such a demand, there exist terminals that can change the alerting tone based upon a predetermined keystrokes by the user at the calling station after the call is set up. The terminal having such a function generally assumes the automatic answering function that answers the incoming call automatically. There, one can set the terminal such that no alerting sound will be activated at the incoming of a call except for the case where the predetermined command is given from the calling terminal. If the command is not provided, the called terminal answers automatically to the incoming call and records the message sent thereto while not alerting the user of the incoming call. Only when the predetermined command is given, the terminal activates an alerting tone that may be different from the usual alerting tone and notifies the user of the incoming call. Thus, the terminal having such a function is useful for the user to reject unwanted calls. On the other hand, the user cannot generally distinguish the calling party based upon the alerting tone, as such a terminal provides only one special alerting tone other than the usual alerting tone. Further, such a telephone set is inconvenient in that the user at the called terminal is not alerted of the incoming call unless the predetermined command is given. One has to call back for the calls that are not brought to one's attention.

Further, there is proposed a telephone set in the Japanese Laid-Open Patent Publication 63-74354 wherein an audio guidance is issued to the user at a calling terminal after a line connection is set up. According to the reference, the audio guidance provided from the called station urges the user at the calling station to issue an identification code of the user and the telephone set that received the call activates an alerting tone corresponding to the user identification code when the same is provided.

Further, there is a variable alerting tone service provided by the vendor of the telecommunication network wherein a plurality of dial numbers are given to a single terminal in the network with respective alerting patterns. When a call occurs, the function of the called terminal is examined and the terminal is controlled by the network to produce the alerting tone in correspondence to the dial number that is used to set up the call to the called terminal, provided that the terminal is allowed to use the variable alerting tone service.

In the known system described in the Japanese Laid-Open Patent Publication 63-74354, however, it will be noted that the alerting tone is not activated even when the line connection is already set up, and there arises problems such as incurring of unnecessary fee. The same problem occurs also in the conventional system described previously. The service provided by the vendor of a telecommunication network also has a problem in that it uses a plurality of dial numbers for a single terminal and wastes the valuable resource of the network.

SUMMARY OF THE INVENTION

Accordingly, it is a general object of the present invention to provide a novel and useful telecommunication system wherein the foregoing problems are eliminated.

Another and more specific object of the present invention is to provide a telecommunication system that includes a plurality of terminals connected with each other by a network, wherein the alerting tone can be changed depending on the calling party under the control of the network, while without using a plurality of dial numbers for a single terminal for changing the alerting tone.

The above and other objects of the present invention are attained by a telecommunication system, comprising a network for carrying a traffic of information; a plurality of terminals connected to said network for communicating with each other via said network; memory means provided in said network with a plurality of memory fields formed therein in correspondence to said plurality of terminals, each memory field in turn containing a plurality of alerting patterns; and control means for reading out, when a call directed to a called terminal comes in from a calling terminal, an alerting pattern corresponding to said calling terminal from the memory field for said called terminal, based upon information that identifies said calling terminal.

According to the present invention, it is configured such that the calling terminal is identified in the network before the user at the called terminal responds to the call and an alerting pattern is read out from the data stored in the network and is sent to the called terminal. Thus, it is possible to generate, at the same as the incoming of the call, an alerting tone specified at the calling terminal. Further, since such a service is provided on the network in the present invention, no additional equipment is necessary at the terminals. Also, the use of a single dial number for a single terminal in the present invention enables an efficient use of network resources.

Other objects and further features of the present invention will become apparent from the following detailed description when read in conjunction with the attached drawings.

BRIEF DESCRIPTION OF THE DRAWINGS

FIG. 1 is a schematic diagram illustrating a telecommunication network of the first embodiment of the present invention;

FIG. 2 is a diagram illustrating a configuration of an exchange used in the present invention;

FIG. 4 is a diagram illustrating the data for an alerting pattern;

FIG. 11 is a schematic diagram illustrating a telecommunication system of the third embodiment of the present invention;

DESCRIPTION OF THE PREFERRED EMBODIMENTS

Figure 3A:
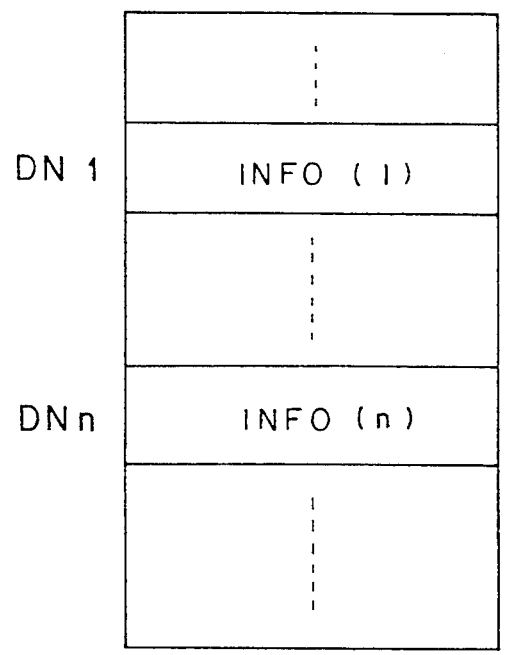
FIGS. 3(A) amd 3(B) show configurations of the data stored in the data base unit used in the exchange shown in FIG. 2.

FIG. 1 is a block diagram schematically illustrating a telecommunication system of the first embodiment of the present invention.

Referring to FIG. 1, a telecommunication system of the first embodiment has a configuration similar to that of the conventional telecommunication system, and comprises a plurality of exchanges 2 and 3 connected to a network 7, and terminals 1 and 4 connected to respective exchanges 2 and 3. When a call is issued from the terminal 1 to the terminal 4, the exchange 2 connected to the calling terminal 1 is activated, and the exchange 3 connected to the called terminal 4 is selected. After a normal network connection procedure, a line connection is established and a communication takes place. Generally, the exchanges 2 and 3 are provided with an alerting tone control apparatus 5 for controlling terminals connected to the exchanges and generating an alerting tone. Generally, the alerting tone control apparatus 5 generates an alerting tone by supplying, when the line connection is established, a control voltage signal corresponding to the alerting tone to the called terminal 4, and at the same time transmits, via the network 7, a signal corresponding to the caller at the called terminal to the calling terminal.

The system shown in FIG. 1 is further provided with an alerting tone selection apparatus 6 for identifying the calling terminal by analyzing the incoming call, for reading out, via the network 7, an alerting pattern corresponding to the identified calling terminal, from a data base 8, and for supplying the pattern thus read out to the alerting tone control apparatus 5. The data base 8 is provided with areas for each terminal, in which areas information relative to each terminal connected to a respective exchange is stored. Each area reserved for a terminal records an identifier indicating whether or not the terminal utilizes the alerting tone change service of the present invention, and an alerting pattern corresponding to each calling terminal. That is, when there is an incoming call from the terminal 1, the alerting tone selection apparatus 6 identifies, on the basis of an alerting tone identification data input by the calling user at the terminal 1, the alerting pattern specified by the calling user, reads out the alerting pattern corresponding to the terminal 1 from the data base 8, and transmits a control voltage signal corresponding to the alerting pattern from the alerting tone control apparatus 5 to the terminal 4. This way, the terminal 4 generates the alerting tone of the pattern specified by the calling terminal 1.

FIG. 2 illustrates a configuration of the exchange 3 shown in FIG. 1.

Referring to FIG. 2, the exchange 3 comprises a first input terminal portion 3a connected to the network 7 and supplied therefrom with an information signal, a second input terminal portion 3b connected to each terminal and supplied therefrom with an information signal, a first output terminal portion 3c also connected to the network 7 and transmitting thereto an information signal, and a second output terminal portion 3d connected to each terminal and outputting thereto an information signal. The terminal portions 3a to 3d are connected to a transmission/reception (switch) unit 301 for controlling the transmission and reception of an information signal. Further, the exchange 3 is provided with a system bus 300, and the transmission/reception unit 301 outputs, when a reception operation is proceeding, a reception information signal received at the terminal portion 3a or 3b to the system bus 300. The transmission/reception unit 301 outputs, when a transmission operation is proceeding, an information signal on the system bus to the terminal portion 3c or 3d.

Further, the system bus 300 is provided with an analysis/identification unit 302 for analyzing an information signal accompanying an incoming call, and for identifying its destination, for example. That is, when a call incoming from the network 7 is received at the transmission/reception unit 301, and an information signal is output to the bus 300, the analysis/identification unit 302 extracts control information contained in the call, identifies the destination of the call, and outputs the control information indicating the same to the bus 300. On the other hand, when there is an incoming call from a terminal connected to the exchange 3, the unit 302 outputs, on the basis of the information signal output to the bus unit 300, control information for establishing the line connection, to the bus 300.

Further, the bus 300 is connected to an exchange control unit 303 for establishing a line connection; the unit 303 controls the transmission/reception unit 301 on the basis of the control information that the analysis/identification unit 302 output to the bus 300, and transmits, either via the terminal portion 3c or the network 7, or directly from the terminal portion 3d, the incoming call to the destination terminal. Thereby, an alerting tone control signal issued from an alerting tone control unit 304, which is also connected to the bus 300, is transmitted, as a voltage signal, from the transmission/reception unit 301 via the terminal portion 3d to the terminal, thus generating an alerting tone. The operations of the transmission/reception unit 301, the analysis/identification unit 302, the exchange control unit 303, and the alerting tone control unit 304 are essentially the same as those of conventional exchanges. In FIG. 3, the unit 304 corresponds to the alerting tone control apparatus 5 shown in FIG. 1.

In the telecommunication system of the present invention, the exchange 3 is provided with a selection unit 305 for selecting the alerting pattern specified at the calling terminal from among a plurality of alerting patterns, on the basis of calling user information added to destination information specifying the destination terminal, which destination information is contained in the control information output from the analysis/identification unit 302 to the bus 300. Further, in correspondence with the selection unit 305, the bus 300 is provided with a data base unit 306 for storing a plurality of alerting patterns. A central processing unit CPU 307 is connected to the bus 300 for the purpose of controlling each of the units 301 to 306. The configuration described so far also applies to the exchange 2 connected to the terminal 1 except that the units 305 and 306 shown in FIG. 2 correspond to the alerting tone selection apparatus 6 shown in FIG. 1. While the units 305 and 306 are shown as being provided in the exchange 3 in the description of this embodiment, they can be provided in the network 7 shown in FIG. 1. By providing the exchange 3 of the configuration shown in FIG. 2 in both the calling terminal and the called terminal, both parties can take advantage of this telecommunication system. When the same is provided in the network 7, the units 305 and 306 can be integrated into one set.

A description will now be given of a configuration of a data base unit provided in the exchange 3 of the called terminal 4.

Figure 3B:
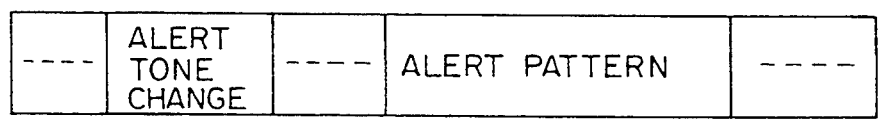

FIG. 3(A) and FIG. 3(B) are diagrams illustrating a configuration of data storage areas formed in the data base unit 306 shown in FIG. 2.

Referring to FIG. 3(A), data storage area DN1-DNn corresponding to each terminal connected to the relevant exchange—the exchange 3, for example—are formed in the data base unit 306, each data storage area storing terminal information relative to the function of the terminal, and to the service stipulated in a contract. For example, the data storage area DN1 stores the terminal information relative to the terminal 1.

FIG. 3(B) is a diagram illustrating the content of terminal information. Referring to FIG. 3(B), the terminal information is divided into a plurality of areas. In this embodiment, an identifier for identifying whether or not the relevant terminal subscribes to the alerting tone change service is provided in one of the areas, while, as shown in FIG. 4, an actual alerting pattern is stored in another area together with an alerting tone specifying code. In FIG. 3(B), the numeral 1 denotes a generation of an alerting tone, while the numeral 0 denotes an interruption of an alerting tone.

By building an alerting pattern control shown in FIGS. 3 and 4 into the exchange of the configuration shown in FIG. 2, the called terminal—the terminal 3, for example—is capable of generating the alerting tone specified by the user at the terminal from which a call is issued.

Figure 5:
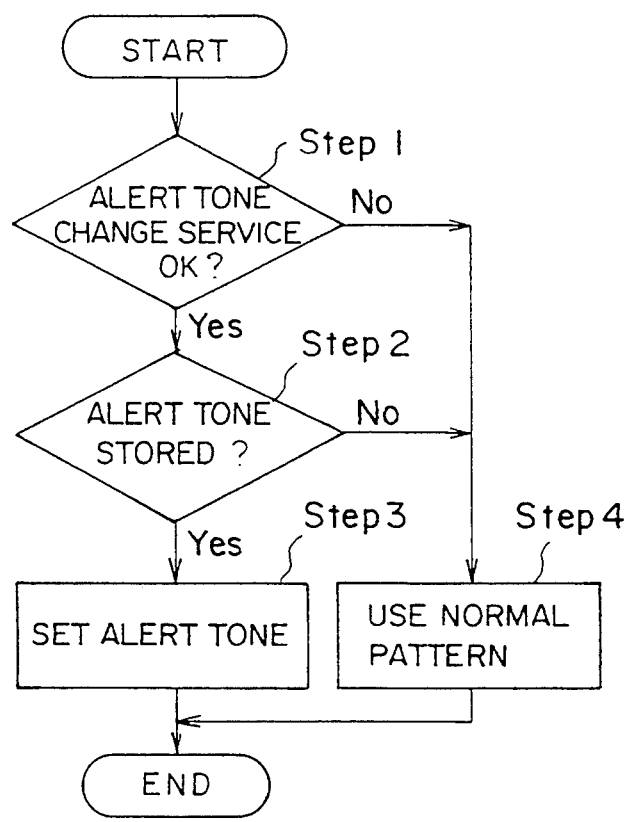
FIG. 5 is a flow chart illustrating a control operation of the first embodiment.

FIG. 5 is a flow chart illustrating an operation of the selection unit 305, which operation is performed under the control of the CPU 307. Referring to FIG. 5, a determination is given in step 1 as to whether or not the alerting tone change service shown in FIG. 3(B) is subscribed to. When the answer YES is arrived at, a determination is then given in step 2 as to whether the specified alerting pattern is included in the registered patterns in FIG. 4. When the answer YES is arrived at, the specified alerting tone is read out in step 3. On the other hand, when the answer NO is arrived at in any of the steps, a usual alerting tone is used in step 4.

Figure 6:
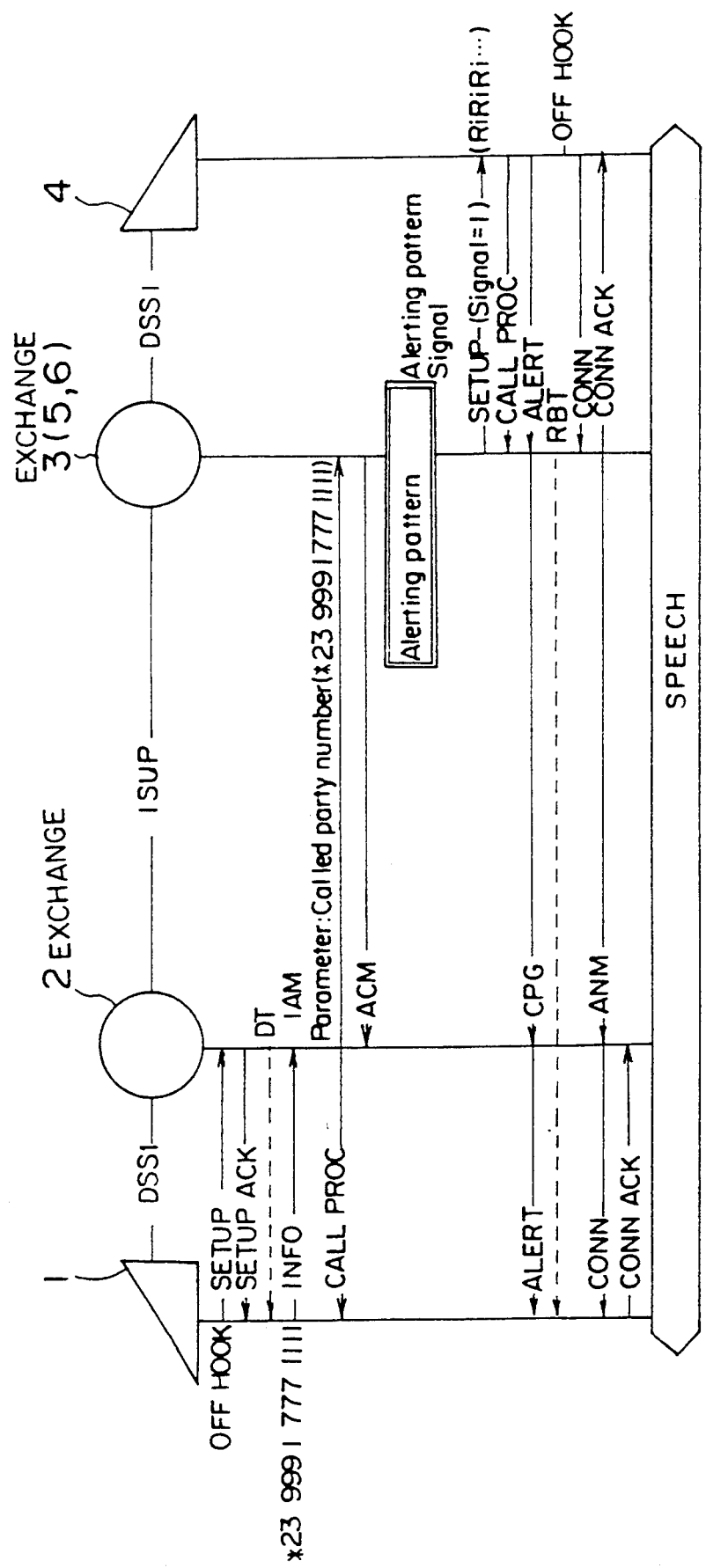
FIG. 6 is a diagram illustrating a connection sequence of the first embodiment.

FIG. 6 is a diagram showing specific sequential operations of the first embodiment. In correspondence with the configuration shown in FIG. 1, the exchange network shown in FIG. 6 comprises a calling terminal 1, a called terminal 4, and a calling station or exchange 2 and a called station or exchange 3 connected to the terminals 1 and 4, respectively. This network is configured such that the terminals 1 and 4 communicate with each other via the stations 2 and 3.

When the calling terminal 1 issues a call to the called terminal 4 in the exchange network shown in FIG. 6, a set up signal (SETUP) is transmitted to the exchange 2 connected to the terminal 1 in response to the action of the user at the calling end, whereby the user puts the terminal 1 into an off hook status (shown in FIG. 6 as "OFF HOOK"). The exchange 2, in response to this transmission, returns a set up acknowledge signal (SETUP ACK) and a dial tone (DT) to the calling terminal 1.

When a dial tone is returned from the station 2, the calling user transmits access information (INFO) to the station 2 by dialing, from the terminal 1, *23 999 1 777 1111, for example, whereby *23 is a service access code for making available the alerting tone change service, 999 a password, 1 an alerting pattern specifying number, and 777-1111 a dial number of the called terminal 4.

The calling station 2 transmits, on the basis of the above access information, IAM (INITIAL ADDRESS MESSAGE) containing the access information (INFO) to the called exchange 3. In the example shown in the figure, the numeral data dialed at the calling terminal 1 is directly transmitted to the called station 3. At the same time as the calling station 2 transmits the IAM to the called exchange 3, it returns a CALL PROCEEDING signal to the calling terminal 1. Also, the called exchange 3 returns an acknowledge signal (ACM) to the calling exchange 2.

The called exchange 3 activates the analysis/identification unit 302 upon reception of the IAM signal by the transmission/reception unit 301, and analyzes the access information (INFO) transmitted from the calling terminal 1. Thereby, apart from extracting a dial number of the called terminal for normal line connection, the unit 302 determines as to whether the access code *23 is contained in the access information, which code indicates the utilization of the alerting tone change service. When the answer NO is arrived at, a normal service, whereby the alerting tone is fixed, is initiated. When the answer is YES, information indicating whether a contract for the alerting tone change service is concluded, which information is contained in the terminal information for the terminal 4, is examined. When the answer NO is arrived at, a normal connection service, whereby the alerting tone is fixed, is initiated. When the answer is YES, the selection unit 305 is activated so that the an alerting pattern specifying number is identified. The selection unit 305 further reads out, on the basis of the an alerting pattern specifying number, an alerting pattern from the data base unit 306, and sends the read pattern to the alerting tone control unit 304. Further, the alerting tone control unit 304 transmits, via the transmission/reception unit 301, a set up signal (SETUP) for generating the specified alerting tone upon which transmission the terminal 4 generates the specified alerting tone.

The called terminal 4 further transmits a CALL PROCEEDING signal to the called exchange 3, which in turn returns an ALERT signal and a ringback tone to the calling terminal 1 via the calling exchange 2. Thereupon, when the user puts the called terminal 4 into an off hook status in response to an alerting tone, a connection signal (CONN) is transmitted to the called exchange 3 and the calling terminal 1. In response to this, a connection acknowledge signal (CONN ACK) is transmitted from the called exchange 3 to the called terminal 4, as well as from the calling terminal 1 to the calling exchange 2, with the result that a communication is established. In this embodiment, the called user has an advantage in that he can identify the user at the calling end by means of an alerting tone alone, since, at the time of issuing a call, the user can specify a desired alerting tone at the calling terminal.

Figure 7:
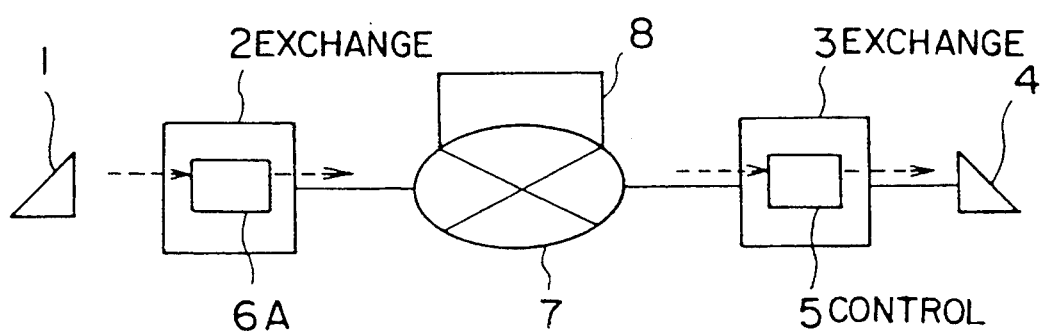
FIG. 7 is a schematic diagram illustrating a telecommunication system of the second embodiment of the present invention.

A description of the second embodiment of the present invention will now be given in accordance with FIG. 7 as well as FIG. 1. In FIG. 7, parts that are the same as those in FIG. 1 are given the same reference numerals, and the description thereof are omitted.

Referring to FIG. 7, this embodiment is configured such that an alerting tone selection apparatus 6A corresponding to the alerting tone selection apparatus 6 shown in FIG. 1 is provided in the calling exchange 2. Accordingly, the selection of an alerting tone is made at the calling exchange.

Figure 8:
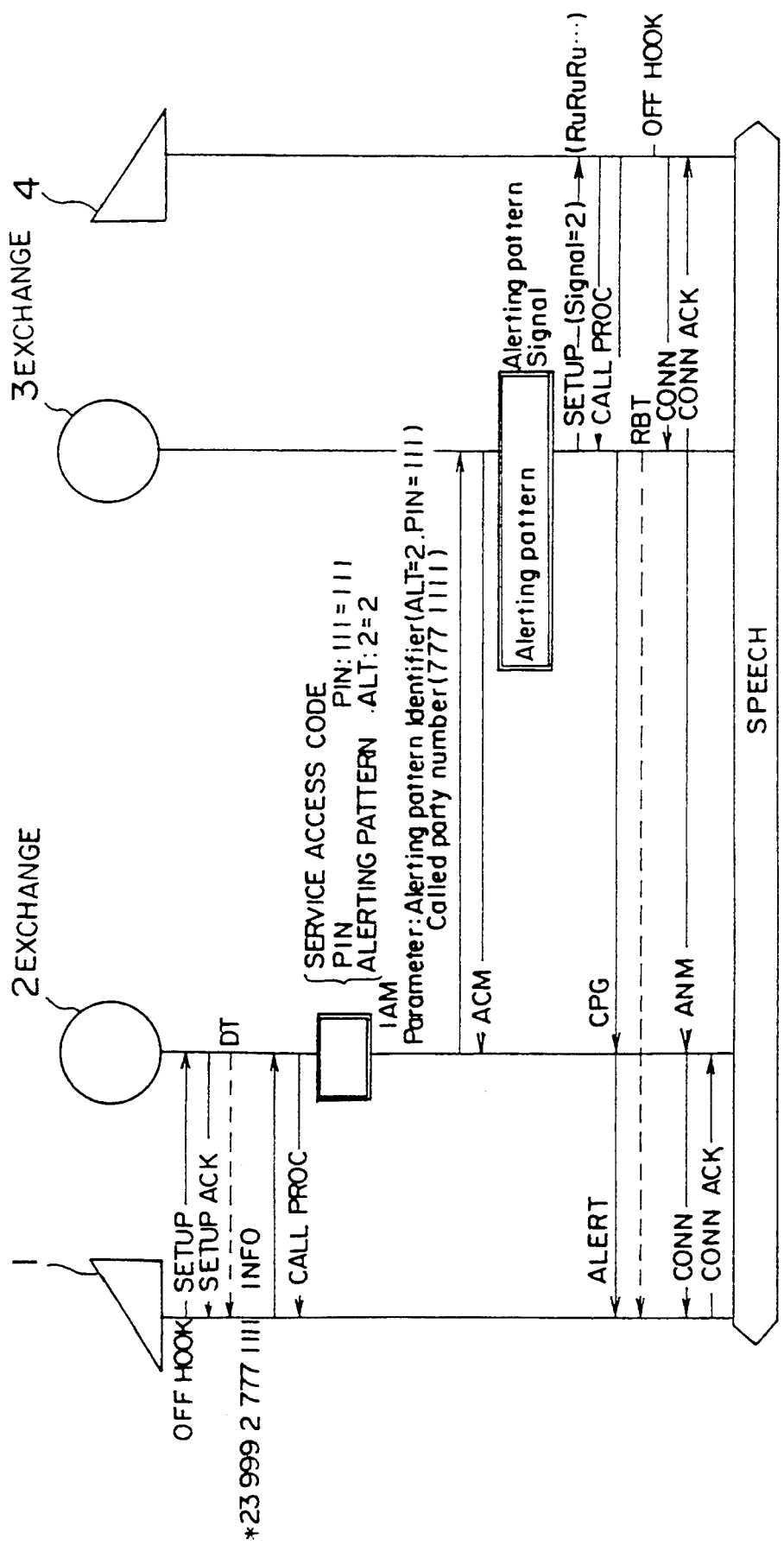
FIG. 8 is a diagram illustrating a connection sequence of the second embodiment.

FIG. 8 is a diagram illustrating specific sequential operations of the system shown in FIG. 7. When the user at the calling end puts the terminal 1 into an off hook status, and transmits the access information to the calling exchange 2 by dialing *23 999 777 1111, for example, the exchange 2, after returning a CALL PROCEEDING signal to the terminal 1, activates, as in the case of the previous embodiment, the alerting tone selection apparatus 6A—the selection unit 305 shown in FIG. 2, more specifically—and the selection unit 305 identifies the alerting tone specifying number, which number is added to the access information INFO. In addition, this embodiment allows the unit 305 to generate an alerting tone specifying code (IDENTIFIER) denoting the alerting tone specifying number, which number is identified as above, and sends IDENTIFIER to the called exchange 3 as a parameter for IAM. In the example shown in the figure, IAM includes, as parameters, the IDENTIFIER and CALLED PARTY NUMBER (DN=777-1111), while IDENTIFIER includes, as parameters, a password (PIN=111) in addition to an alerting pattern (ALT=2).

The called exchange 3, after returning an acknowledge signal ACM in response to IAM, activates the selection unit 305 in the called exchange 3, reads out an alerting pattern from the data base unit 306 in accordance with the procedure shown in FIG. 5, and sends the read pattern to the terminal 4 via the alerting tone control unit 304 so that an alerting tone specified by the user at the terminal 1 is generated.

A description of the third embodiment of the present invention will be given next. Before going into a description of the embodiment, a brief description will be given of the exchange network used in this embodiment.

In this embodiment, the exchange network is equipped with a City Wide Centrex function for converting, when the calling terminal 1 issues a call by specifying the called terminal 4 by an extension number, the extension number into a line wire number corresponding to the called terminal 4 before establishing a call connection.

Figure 9:
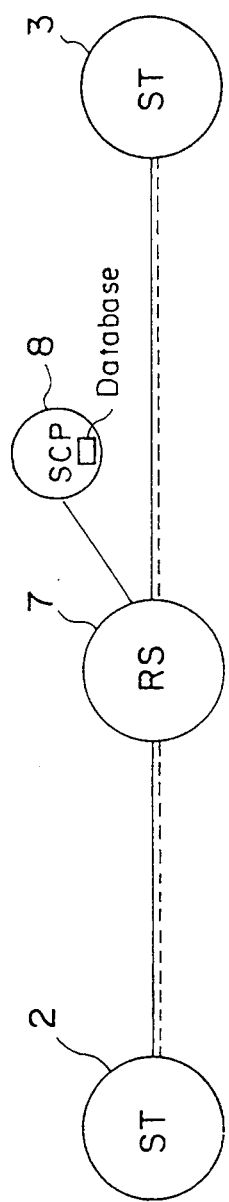
FIG. 9 is a diagram illustrating a configuration of a network in which the third embodiment of the present invention is applied.

FIG. 9 schematically illustrates the exchange network in which the present invention is applied. In the configuration of FIG. 9, a transit station 7 is disposed between the calling station or exchange 2 and the called station or exchange 3, to which transit station 7 is added a SCP (SERVICE CONTROL POINT) 8, where an analysis of information is conducted, as a data base.

Figure 10:
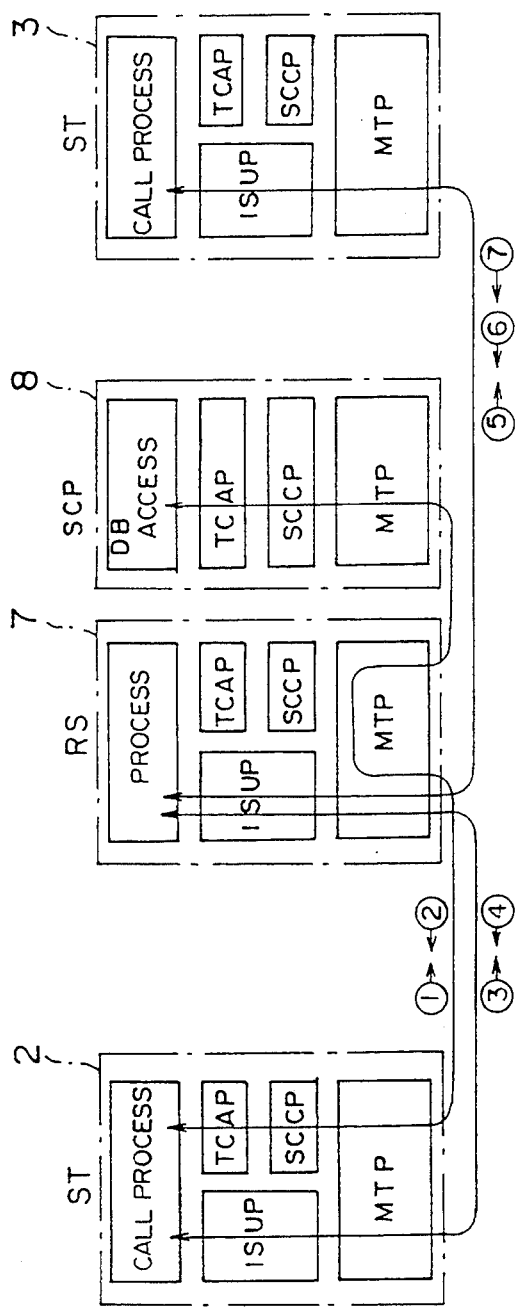
FIG. 10 is a diagram illustrating a protocol hierarchy configuration of the network shown in FIG. 9.

FIG. 10 illustrates a protocol hierarchy in this embodiment. MTP (MESSAGE TRANSFER PART) in FIG. 10 is a part having a function of selecting a route of a signal in accordance with a signal traffic status, and SCCP (SIGNALLING CONNECTION CONTROL PART) is a part having a function of transmitting various signals other than a normal call control signal and a general purpose data part. ISUP (ISDN USER PART) is a part having a function of controlling the setting and releasing of various calls that ISDN involves, and of controlling additional service, while TCAP (TRANSACTION CAPABILITIES APPLICATION PART) is a part having a function of performing, by taking advantage of SCCP, a general purpose transmission management of the transactions including inquiries into such information as maintenance/operation information and service information, which transactions are carried out between exchanges and between the an exchange and a service control nose, while not being involved in the control by SCCP. Flows—in FIG. 10 correspond to procedures—in FIG. 15, of which an explanation is given later.

Protocols shown in FIG. 10 include layers ranging from level 1 to level 4, of which the levels 1 to 3 are MTPs, and levels higher than MTP is given a generic name of level 4. The lowest position layer in the level 4 is SCCP and achieves, in combination with MTP, the function of the layer 3 as defined in the OSI reference model. The OSI reference model is an transmission model with regard to information exchanged between processes taking place in different systems, the main concept thereof being a hierarchy of telecommunication functions, whereby telecommunication functions in a system are divided into seven layers. Starting from the one nearest to a physical medium, number from 1 to 7 are given to each layer. The layer 3 (network layer) is embodied by various telecommunication networks such as a data communication network or a telephone network. The same layer manages relay operation for establishing a communication channel with an end system to which a communication takes place, and a routing function (bypass function), so as to guarantee data transmission between the end systems.

A user part of the level 4 is a part which controls the transactions of messages in the form of call control signals for setting and releasing calls between exchanges. Specifically, the user part in the ISDN network that is charged with call control is called ISUP. An application part in the level 4 is a part which is not directly involved in such control but is charged with the transmission of such information as maintenance/operation information and service processing information between exchanges and between an exchange and a service control node, the transmission being carried out by taking advantage of SCCP. TCAP is a part in the application part providing a function of conducting a general purpose transmission management of transactions.

Figure 12:
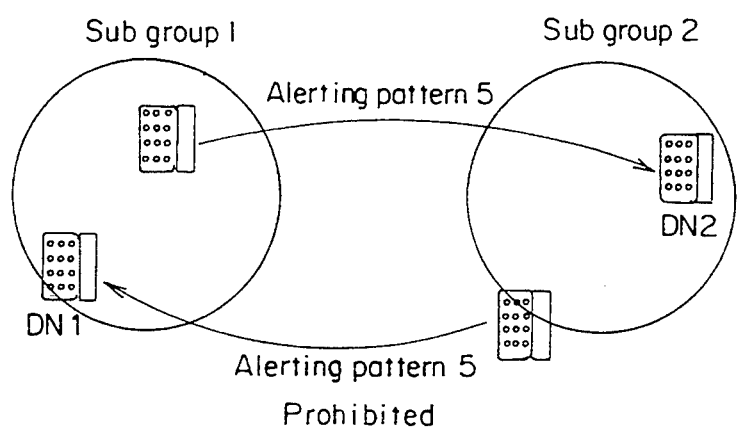
FIG. 12 is a diagram illustrating a concept of service of the third embodiment.

On the assumption that the network configuration shown in FIG. 9 described above and the protocol hierarchy configuration shown in FIG. 10 are introduced, a description of the third embodiment of the present invention will be given. The service of this embodiment is shown in FIGS. 11 and 12.

Figure 11:
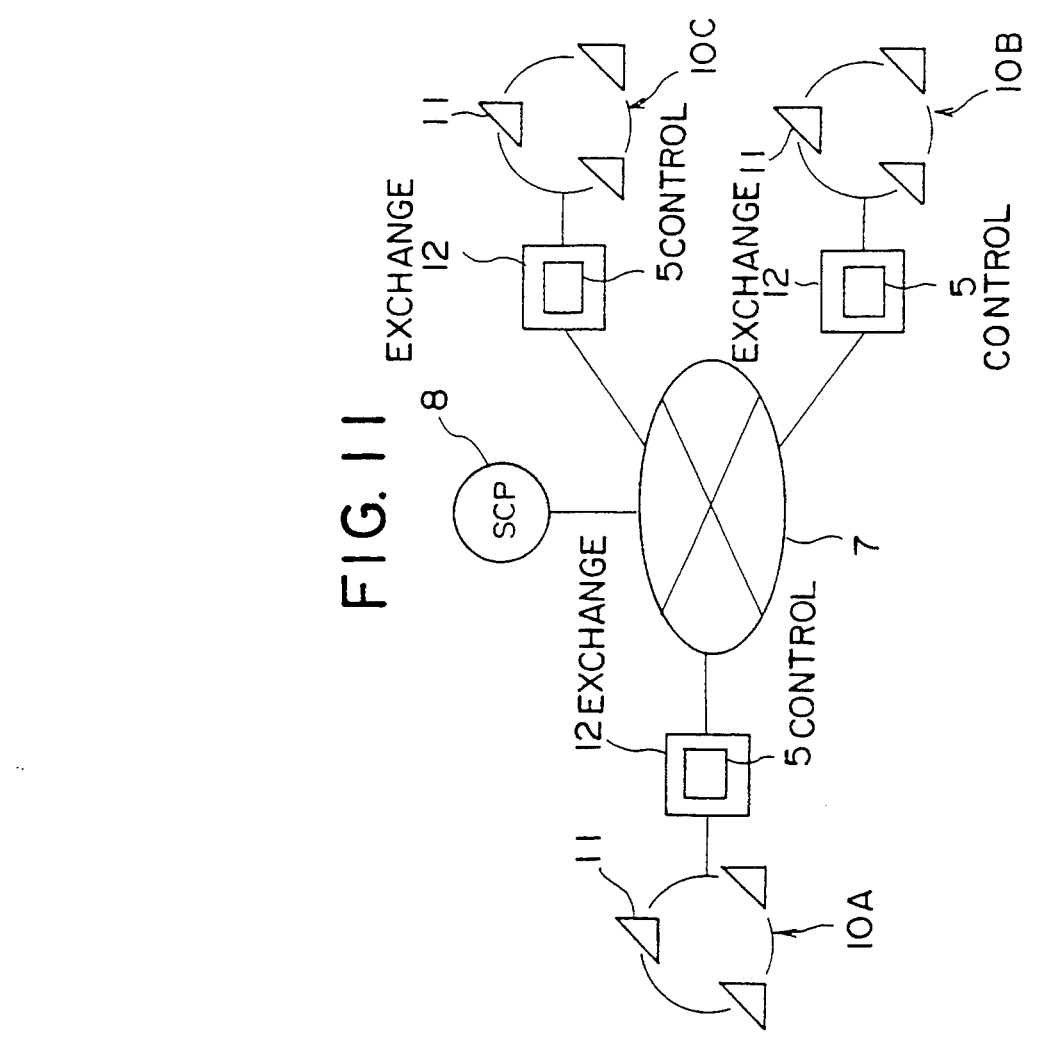

Referring to FIG. 11, a plurality of terminals 11 are connected to a network 7 via exchanges 12 corresponding to the exchanges 2 and 3, wherein the plurality of terminals are grouped into a plurality of subgroups 10A, 10B, and 10C for each exchange 12. Each exchange 12 is provided with an alerting tone control apparatus 5, which supplies a predetermined alerting pattern assigned to each subgroup to the called terminal. In the system shown in FIG. 11, the user at the called terminal can identify, on the basis of the alerting tone, the group to which the calling user belongs.

Moreover, when performing a change of an alerting tone for individual subgroups consisting of terminals, there is a need not to use the same alerting tone for two different subgroups. That is, as shown in FIG. 12, when a terminal in the subgroup 1 uses the alerting pattern #5, it is necessary to forbid the use of the alerting pattern #5 by a terminal in the subgroup 2. Referring to FIG. 12, the figure shows a case where the subgroup 1 registers the alerting patterns 1, 3, and 6, and the subgroup 2 registers the alerting patterns 1, 3, 5, 6, and 7. Thereby, if a terminal in the subgroup 1 selects #5 as the alerting pattern for a terminal in the subgroup 2, a change control, by which control the alerting pattern #5 is set, is possible at the called terminal in the subgroup 2. On the other hand, when a terminal in the subgroup 2 selects, under the same circumstances, #5 as the alerting pattern for a terminal in the subgroup 1, a change control, by which control the alerting pattern #5 is selected, is not possible at the called terminal in the subgroup 1.

Permitting such changes creates a likelihood that all subgroups use the same alerting pattern, whereby identification of the subgroup according to an alerting pattern is impossible.

Such change control of the alerting pattern cannot be performed at an exchange as described in connection with the first and second embodiments, which exchange is provided in correspondence with each subgroup consisting of terminals. In order to perform a change control like the above, it is desirable that a necessary control be performed at SCP 8 provided as a common resource on the network 7. The control performed at SCP 8 will be described hereinafter.

Figure 13:
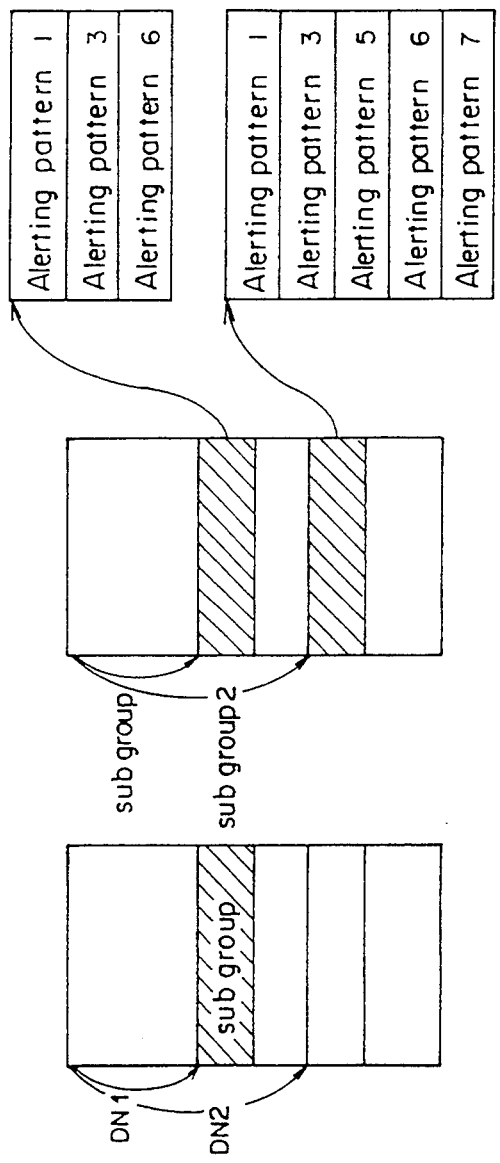
FIG. 13 is a diagram illustrating a data configuration in a service control point (SCP) used in the third embodiment.

FIG. 13 represents a storage apparatus provided in SCP 8 and corresponding to the data base unit 306. By referring to FIG. 13, the storage apparatus stores the data by which a number (1 or 2) for the subgroup to which a called terminal belongs is obtained from a telephone number (DN1, DN2) of a called user, and the data by which a registered alerting pattern is obtained from the subgroup number.

In the example shown in the figure, the telephone number DN1 represents the terminal 11 belonging to the subgroup 1, and alerting patterns #1, #3, and #6 are assigned to the subgroup 1. Alerting patterns #1, #3, #5, #6, and #7 are assigned to the subgroup 2.

A description of the procedure for performing, under such circumstances, an alerting tone change control while conforming to the restrictions shown in FIG. 12 will be given in accordance with FIGS. 14 and 15.

Figure 14:
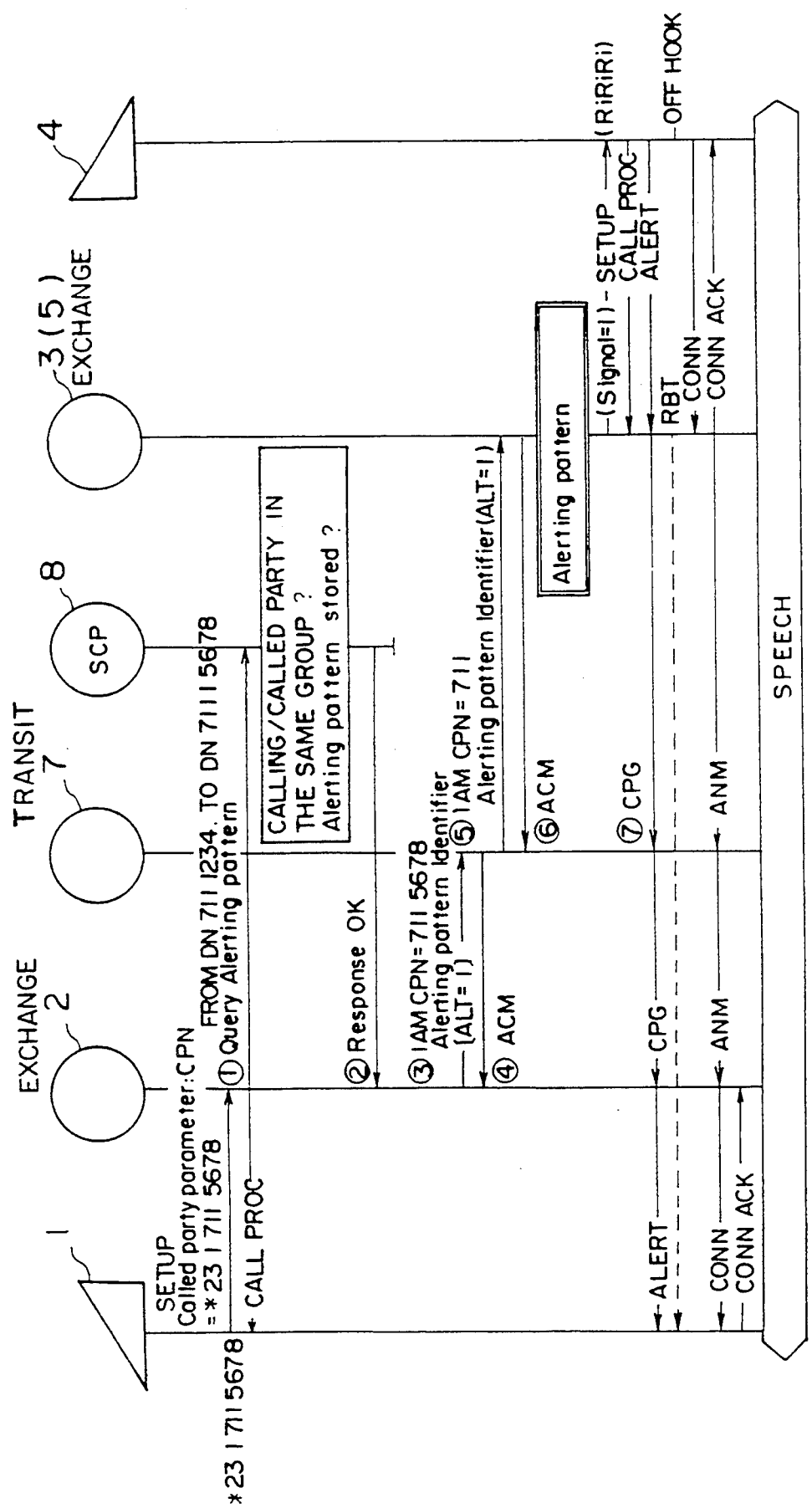
FIG. 14 is a diagram illustrating a connection sequence of the third embodiment.
Figure 15:
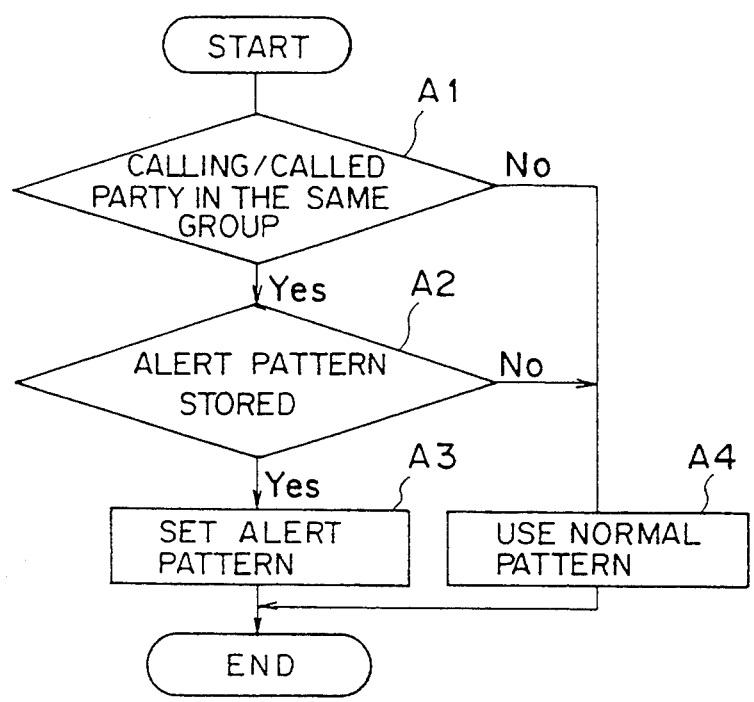
FIG. 15 is a flow chart showing processes of the third embodiment.

Referring to a sequence diagram of FIG. 14, when the calling terminal 1 (DN: 711 1234) in the subgroup 1 issues a call by specifying the alerting pattern 1 in correspondence with the called terminal 4 (DN: 711 5678) in the subgroup 2, the calling user dials "*23 1 777 5678" from the calling terminal 1.

As shown in this dialing prompts a check request (QUERY) to be transmitted from the calling station 2 to SCP 8 via the transit station 7. A calling telephone number (calling DN)/called telephone number (called DN) and an alerting pattern specifying signal (1) are input into SCP 8, after which a check (VALIDATION CHECK) is carried out in accordance with the flow chart of FIG. 15.

In this embodiment, each subscription to the alerting pattern change control service of this embodiment is allocated to each terminal group covered by a City Wide Centrex function applied thereto. Only when a calling user and a called user belong to the same group and the terminals 1 and 4 subscribe to the alerting pattern change control service of this embodiment, a change control of the alerting pattern at the called terminal 4 is performed.

SCP 8 determines, on the basis of the data stored therein, or more generally, in a data base as shown in FIG. 13, whether the calling user and the called user (the calling terminal 1 and the called terminal 4) belong to the same group (step A1). When they belong to the same group, a determination is given as to whether the specified alerting pattern is registered for the subgroup to which the called terminal 4 belongs (step A2). If the answers YES are arrived at in both steps 1 and 2, the specified alerting tone is set (step A3). On the other hand, if the answer NO is arrived in either of the steps A1 or A2, not the specified alerting tone but the normal alerting tone is set (step A4). When SCP 8 gives a determination that the specified alerting tone be set (step A3), a Response OK signal is returned to the calling station 2, as shown by in FIG. 14.

At the calling station 2, an alerting pattern IDENTIFIER is generated from a change access code "*23", and the alerting pattern specifying number ("1" in this embodiment) information added to the numeral data from the calling terminal 1 is stored in a particular parameter, and transmitted to the called station 3 via the transit station 7 (see the procedure and in FIG. 14). That is, an IAM parameter is sent to the called station 3 as an alerting pattern IDENTIFIERIDT (ALT=1) and IAM CALLED PARTY NUMBER (=711 5678). The transit station 7, which received the IAM parameter, returns an acknowledge signal (ACM) to the calling station 2 (see the procedure in FIG. 14), while the called station 3, which received the IAM parameter, returns the acknowledge signal (ACM) to the transit station 7 (see the procedure in FIG. 14).

As in the first and second embodiments, the called station 3 collates the information sent from the calling station 2 as the IAM parameter with the user data information, and, upon a determination that there is no inconsistency, an alerting pattern is determined and the determined alerting pattern is supplied by an alerting pattern supplying means 5 to the called terminal 4 so that the called terminal 4 is alerted.

As in the case of the first embodiment, the third embodiment, in which the method of the present invention is applied to an exchange network having a City Wide Centrex function, also enables the changing of an alerting pattern at the called terminal 4 at the discretion of a calling user.

Figure 16:
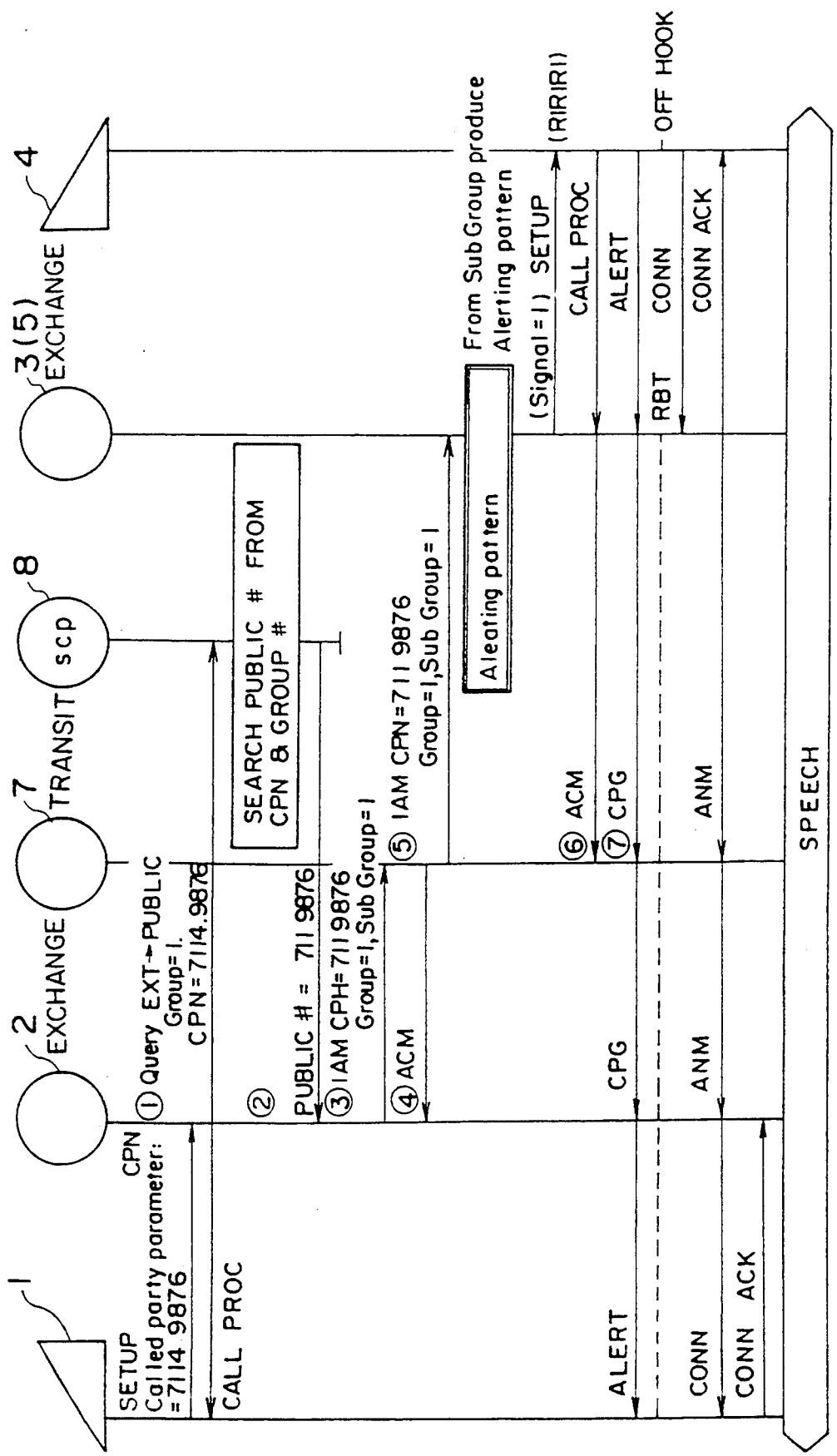
FIG. 16 is a diagram illustrating a connection sequence of the fourth embodiment.
Figure 17:
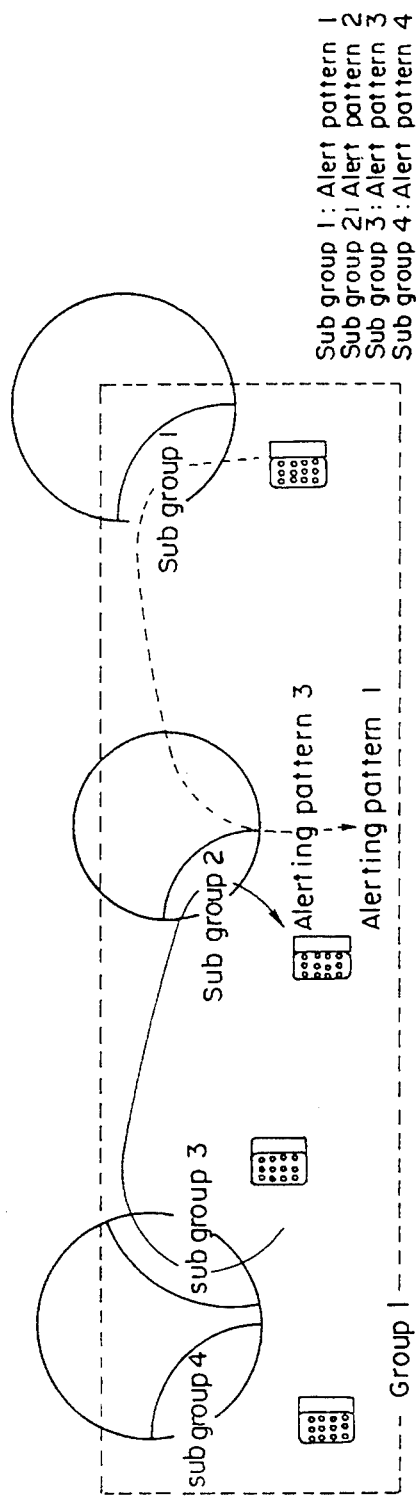
FIG. 17 is a diagram illustrating a concept of service of the fourth embodiment.

FIG. 16 is a diagram illustrating an operational sequence of the fourth embodiment of the present invention, and FIG. 17 is a diagram illustrating the outline of the service provided in this embodiment. The fourth embodiment has the same City Wide Centrex function as in the third embodiment, and the same network configuration (see FIG. 9) and protocol hierarchy configuration (see FIG. 10) as in the third embodiment are assumed therein.

In this embodiment, as shown in FIG. 17, a group consisting of a plurality of terminals subscribing to the aforementioned City Wide Centrex function service are divided into four subgroups (Sub groups 1 to 4), and a predetermined alerting pattern is allocated to each subgroup. For example, for each of the Sub groups 1 to 4, alerting pattern (Alert pattern) numbers #1 to #4 are allocated.

As shown in FIG. 16, unlike the first through third embodiments, this embodiments allows, when the calling terminal 1 belonging to the Group 1 Sub group 1 issues (dials) a call to the called terminal 4 (extension number: 711 9876) belonging to the Sub group 2 without adding a change access code, the calling station 2 to transmit, as shown in a City Wide Centrex request (QUERY) to SCP 8 via the transit station 7 such that Group=1, CPN=7114 9876 is specified.

SCP 8 retrieves, from the data stored in SCP 8, a CPN (extension number) dialed at the calling terminal 1 so that a line wire number corresponding to that extension number is obtained. This line wire number (711 9876) is returned, as shown by in FIG. 16, to the calling station 2 as a Response signal.

The calling station 2 sends, as an IAM CALLED PARTY NUMBER (=711 9876), that line wire number to the called station 3 via the transit station 7, and the numbers for the Group and Sub group to which the calling terminal 1 belongs is sent to the called station 3 via the transit station 7 (see the procedures and FIG. 16).

The called station 3 collates the Group numbers for the calling terminal 1 and the called terminal 4, and, upon determining that they are the same, determines, on the basis of the number of the Sub group to which the calling terminal 1 belongs, the alerting pattern (#1 in the present case) allocated to that particular Sub group. The alerting pattern is then supplied to the called terminal 4 by the alerting pattern supplying means 5 at the called station 3 so that the called terminal 4 is alerted.

This way, the fourth embodiment of the present invention allows, when the calling terminal 1 issues a call, the alerting tone of the called terminal 4 to be automatically changed to that of the pattern corresponding to the Sub group to which the calling terminal 1 belongs.

Figure 18:
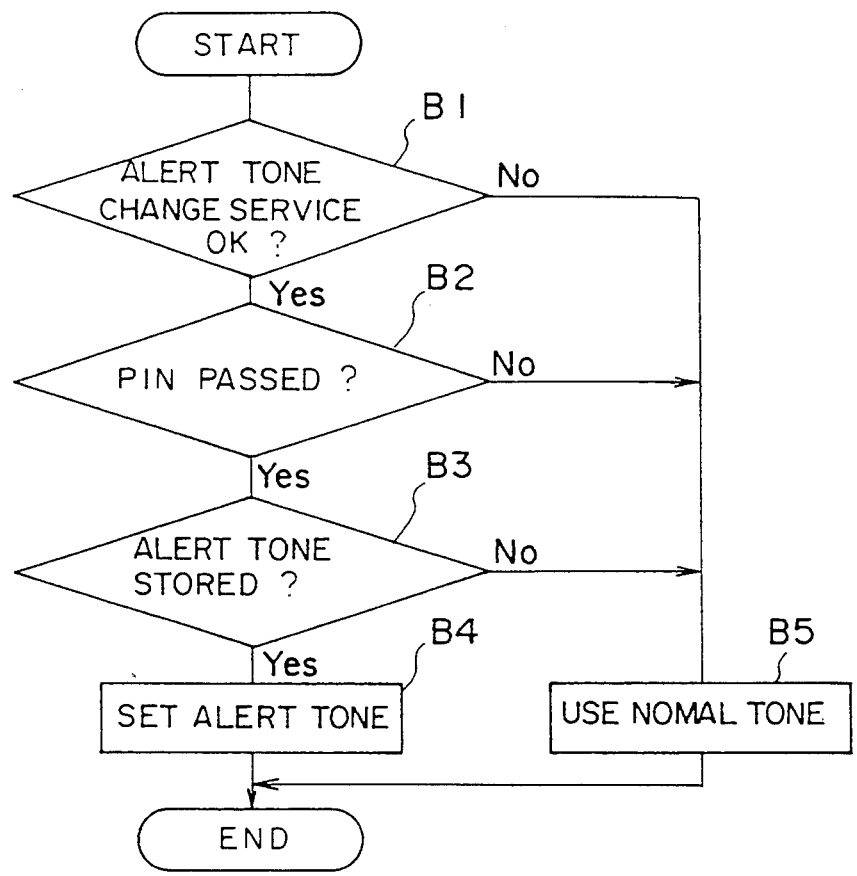
FIG. 18 is a flow chart showing processes of the fifth embodiment of the present invention.

A description of the fifth embodiment of the present invention will be given in accordance with the flow chart of FIG. 18 illustrating a sequence of processes and with FIG. 19, which illustrates a data base configuration.

Figure 19:
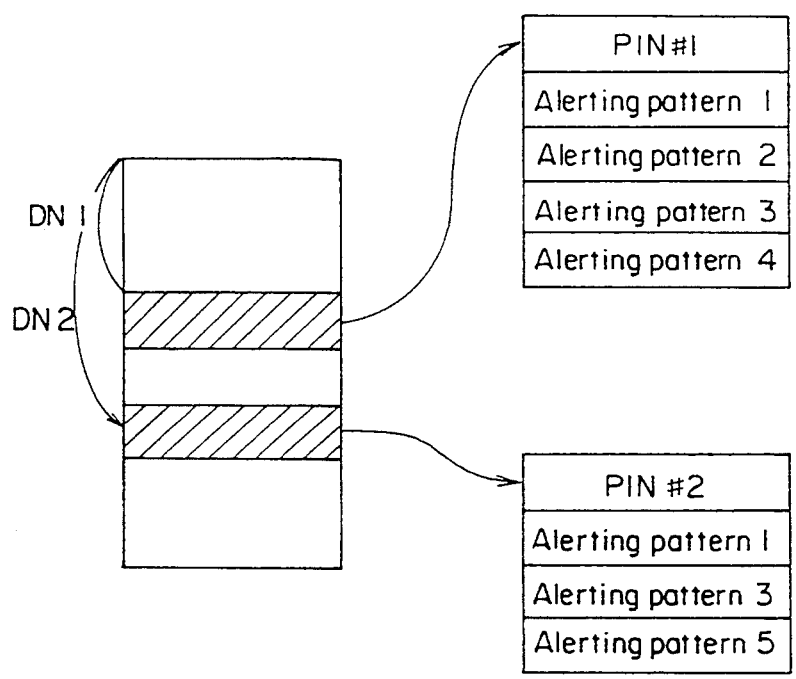
FIG. 19 is a diagram illustrating a data base configuration of the fifth embodiment.

While this embodiment is applied to the system of the first and second embodiments, it is unique in that a predetermined password (PIN) and the kind of alerting pattern selected at the called terminal 4 (Alerting pattern number) are stored, in the form of a data base as shown in FIG. 19, for each individual called terminal number (DN1, DN2) in an exchange network. The data base can be installed in the called station 3 or can be installed in SCP 8, whose service is provided via the transit station 7.

Referring to the procedures shown in FIG. 8, this embodiment allows, when the calling terminal 1 issues a call to the called terminal 4, a password (PIN) is added to the data sent from the calling terminal 1 in addition to the alerting pattern specifying number (Alerting pattern), before the data is sent to the called station 3. Thereby, the called station 3 determines (step B1) whether or not the called terminal 4, which is a called user, subscribes to this service (alerting pattern change control service), determines (step B2), upon determining that it does, whether or not the password (PIN) received matches the one allocated to the relevant called user, and, upon determining that it does, determines (step B3) whether the alerting pattern specifying number is of a kind selectable at the relevant called terminal 4.

If the answers YES are arrived at in the steps B1 to B3, the specified alerting tone is set (step B4), while, if any of the steps B1 to B3 yields the answer NO, not the specified alerting tone but the normal alerting tone is set (step B5). When SCP 8 gives, as in the system of the third embodiment, a determination that the specified alerting tone be set (step B4), a Response OK signal shown by in FIG. 14 is returned to the calling station 2.

This way, this embodiment allows the password of the called terminal 4 to be checked at a data base or a data storage unit 306, and, only when the password matches the predetermined number in the data base, the called terminal 4 is alerted using the alerting pattern based on the specifying number.

In case SCP 8 is used as a data base, the above-mentioned password verification is performed at SCP 8, the result of the verification being returned to the calling station via the transit station 7.

A description of the sixth embodiment of the present invention will be given next in accordance with the diagram of FIG. 20.

This embodiment is a special case of the system of the first and second embodiments where the exchange network thereof is equipped with a call transfer function. Specifically, when a communication is established, as shown in FIG. 20, between the calling terminal (USERA) 1 and the called terminal (USERB) 4 in accordance with the same procedures as in the first and second embodiments, this embodiment allows a call from the calling terminal 1 to be transferred to another user terminal (USERC) 9, by specifying the called terminal 4. This embodiment allows a change control of an alerting pattern even in the case of a transfer by called party (a case where a transfer factor originates from the specification by a called user) such as the above.

Figure 20:
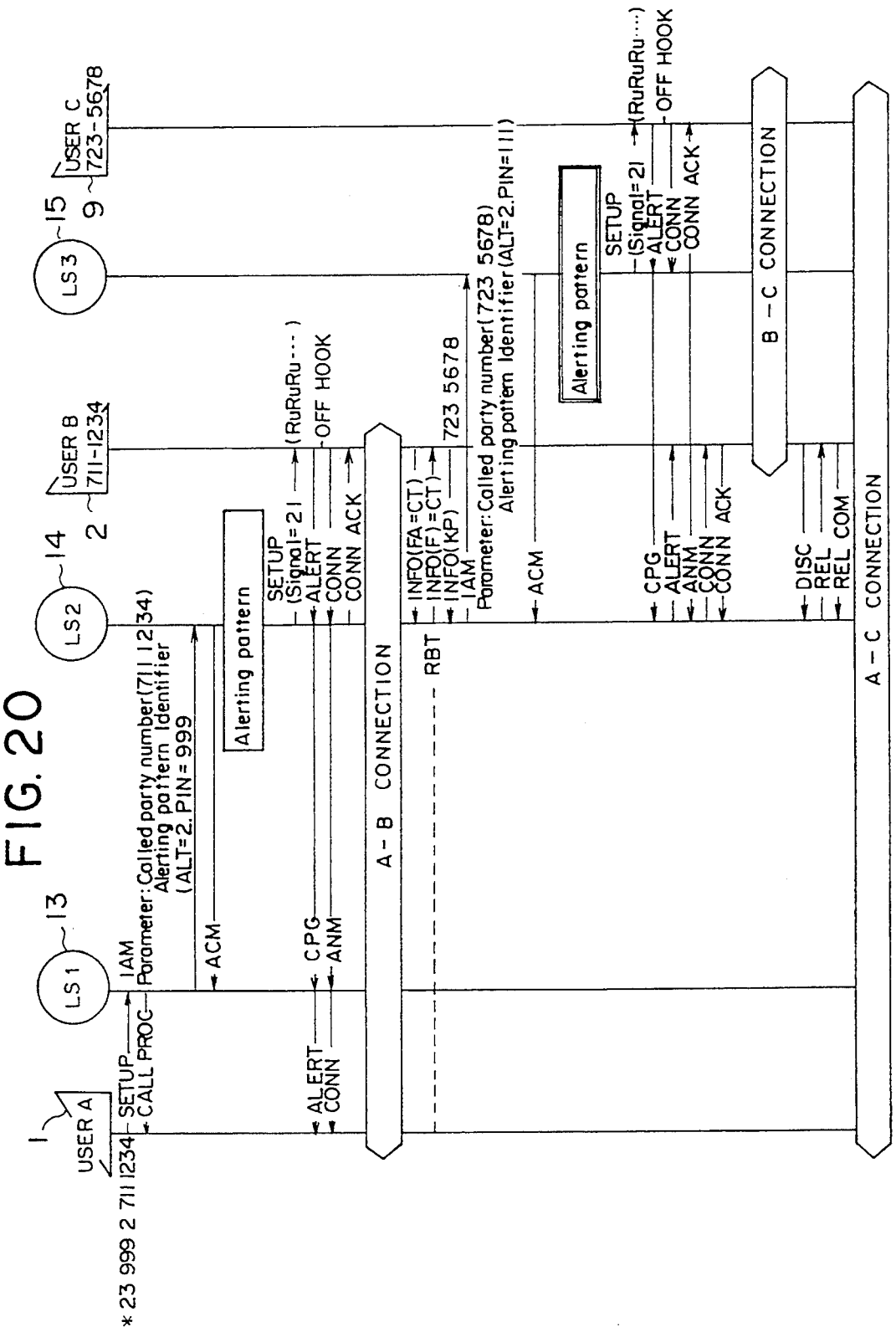
FIG. 20 is a diagram illustrating a connection sequence of the sixth embodiment.

In FIG. 20, exchanges 13 to 15 are exchanges which house respective terminals 1, 4, and 9. Each of the exchanges 13 to 15 are provided with the above-mentioned alerting pattern supplying means 5 not shown in the figure. In this embodiment, the same alerting pattern specifying number (#2 in this case) as when the calling terminal 1 issues a call to the called terminal 4 is added, when the called terminal 4 transfers a call to another user terminal 9, to an IAM parameter at the exchange 14. The IAM parameter is transferred to the other user terminal 9 via the exchange 15 so that the other user terminal 9 is alerted according to the same pattern as the alerting pattern of the called terminal 4.

A description of the seventh embodiment of the present invention will be given in accordance with the sequence diagram of FIG. 21.

This embodiment is also a special case of the system of the first and second embodiments, where the exchange network thereof is equipped with a call transfer function. Specifically, the seventh embodiment pertains to an alerting pattern change control method in a case where a call issued from the calling terminal (USERA) 1 to the called terminal (USERB) is not received by the terminal 4 but is automatically transferred to another user terminal (USERC) 9, on the basis of the status of the called terminal 4 (in which status the called terminal 4 is not put into an off hook status); namely a case where a transfer factor originates from the status of a called user) user.

Figure 21:
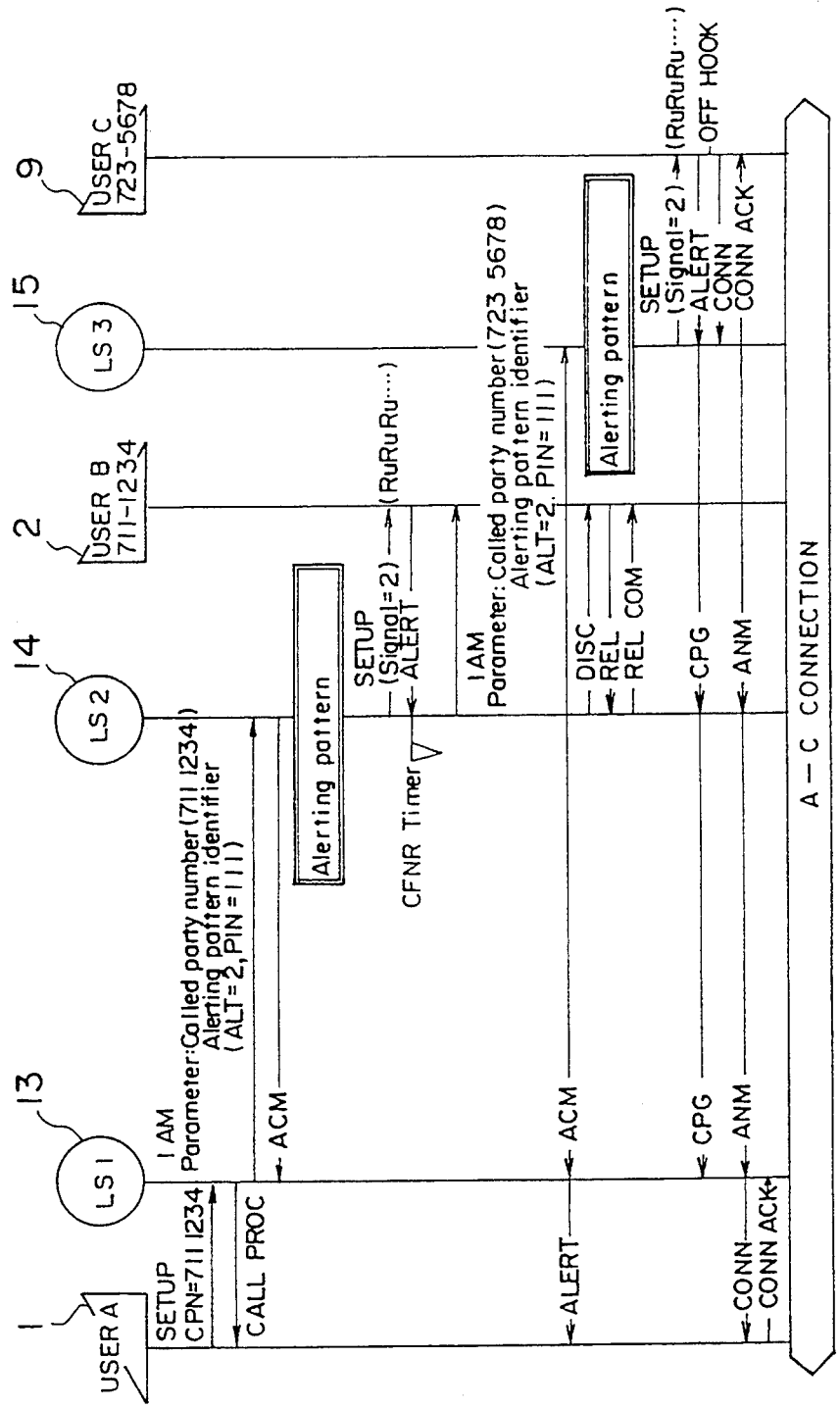
FIG. 21 is a diagram illustrating a connection sequence of the seventh embodiment.

As shown in FIG. 21, this embodiment allows the called terminal 4 to be alerted by the specified predetermined alerting pattern in response to a call issuance by the calling terminal 1, whereby upon a elapse of a predetermined period of time (clocked by a timer) during which the called terminal 4 is not put into an off hook status, the call is automatically transferred from the called terminal 4 to another user terminal 9. The same alerting pattern specifying number (#2 in this case) as when the calling terminal 1 issues a call to the called terminal 4 is added to an IAM parameter at the exchange 14, and transferred to the other user terminal 9 via the exchange 15 so that the other user terminal 9 is alerted by the same pattern as the alerting pattern of the called terminal 4.

This way, the embodiments of the present invention allow an alerting pattern of the called terminal 4 to be subject to a change control, either on the basis of the group to which a caller belongs or at the discretion of the caller, thus enabling the characteristic of the information from the caller to be transported to the called party by means of an alerting pattern, also enabling the called party to determine the characteristic of the information and to make a choice on the information before initiating a communication status by putting the terminal into an off hook status.

These embodiments have advantages in that this alerting pattern change control service is available from any terminal such as a telephone if a calling user dials a specified service access code, and that this alerting pattern change control service can be applied to an exchange network having a City Wide Centrex function, an exchange network having a call transfer service function, and other networks, so that users of this service can be invited form a wide sphere.

A description of the eighth embodiment of the present invention will be given next in accordance with the flow charts of FIGS. 22A-22C and the configuration shown in FIG. 23.

This embodiment is applicable to any of the first through seventh embodiments and has a function of transmitting a voice guidance to the calling terminal upon receipt of an incoming call, so as to request a password and an alerting tone number.

Figure 22A:
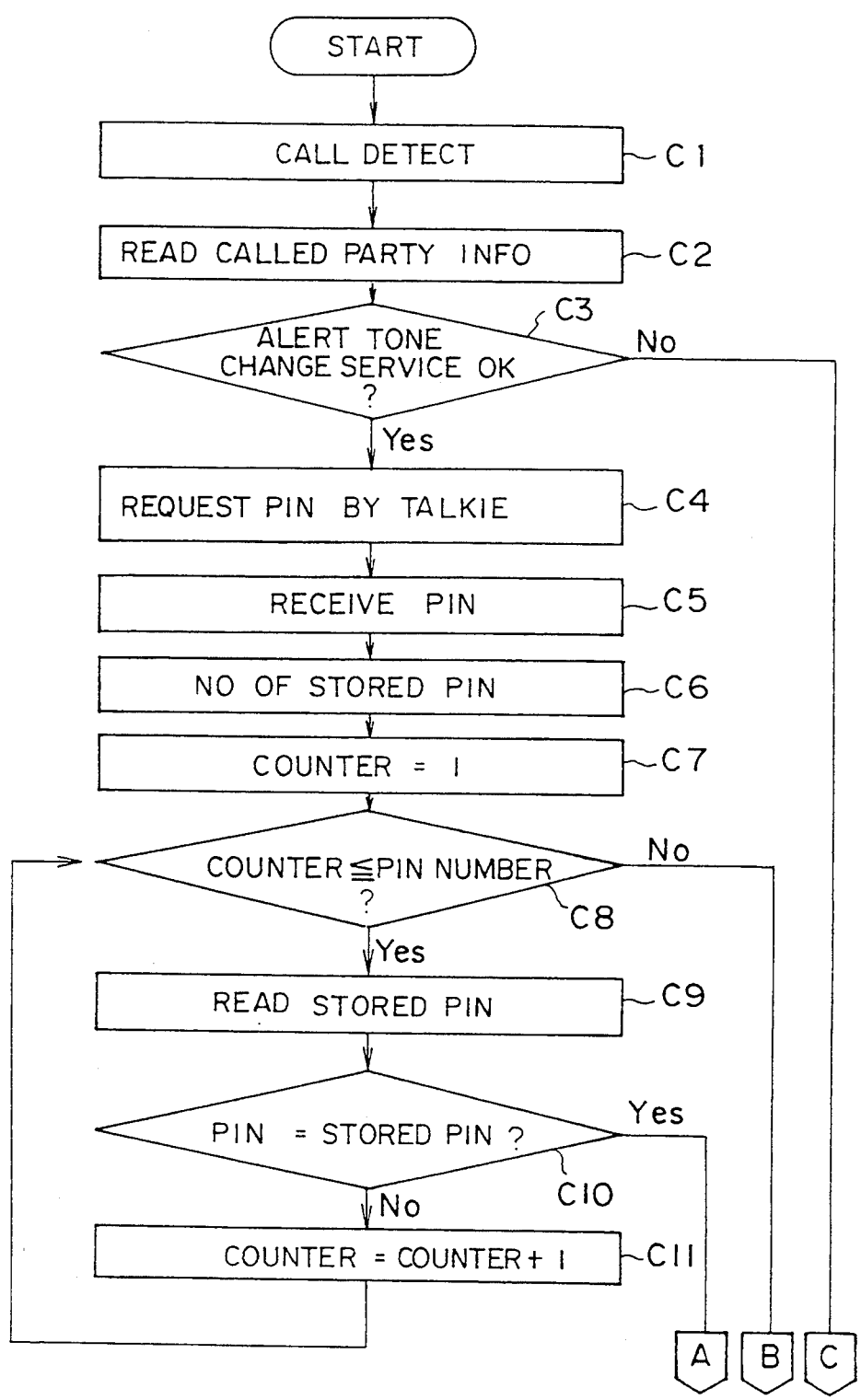
FIGS. 22(A) to 22(C) show a flow chart illustrating the operation of the eighth embodiment of the present invention.
Figure 22B:
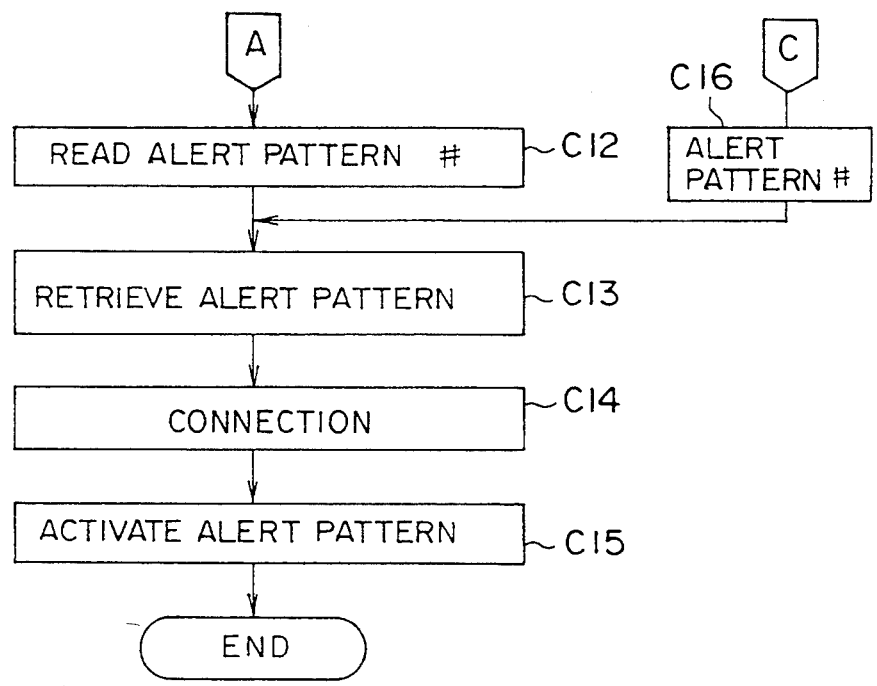
Figure 22C:
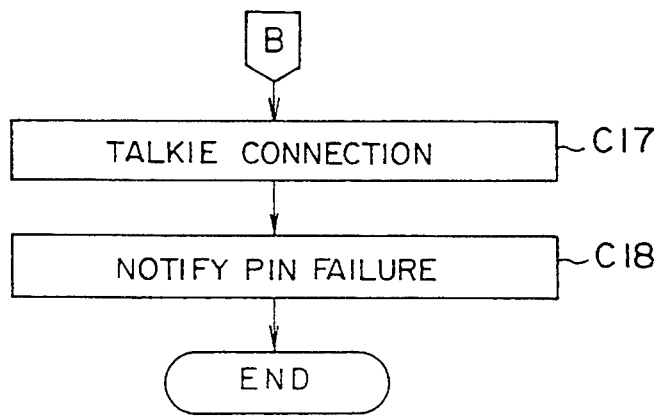
Figure 23:
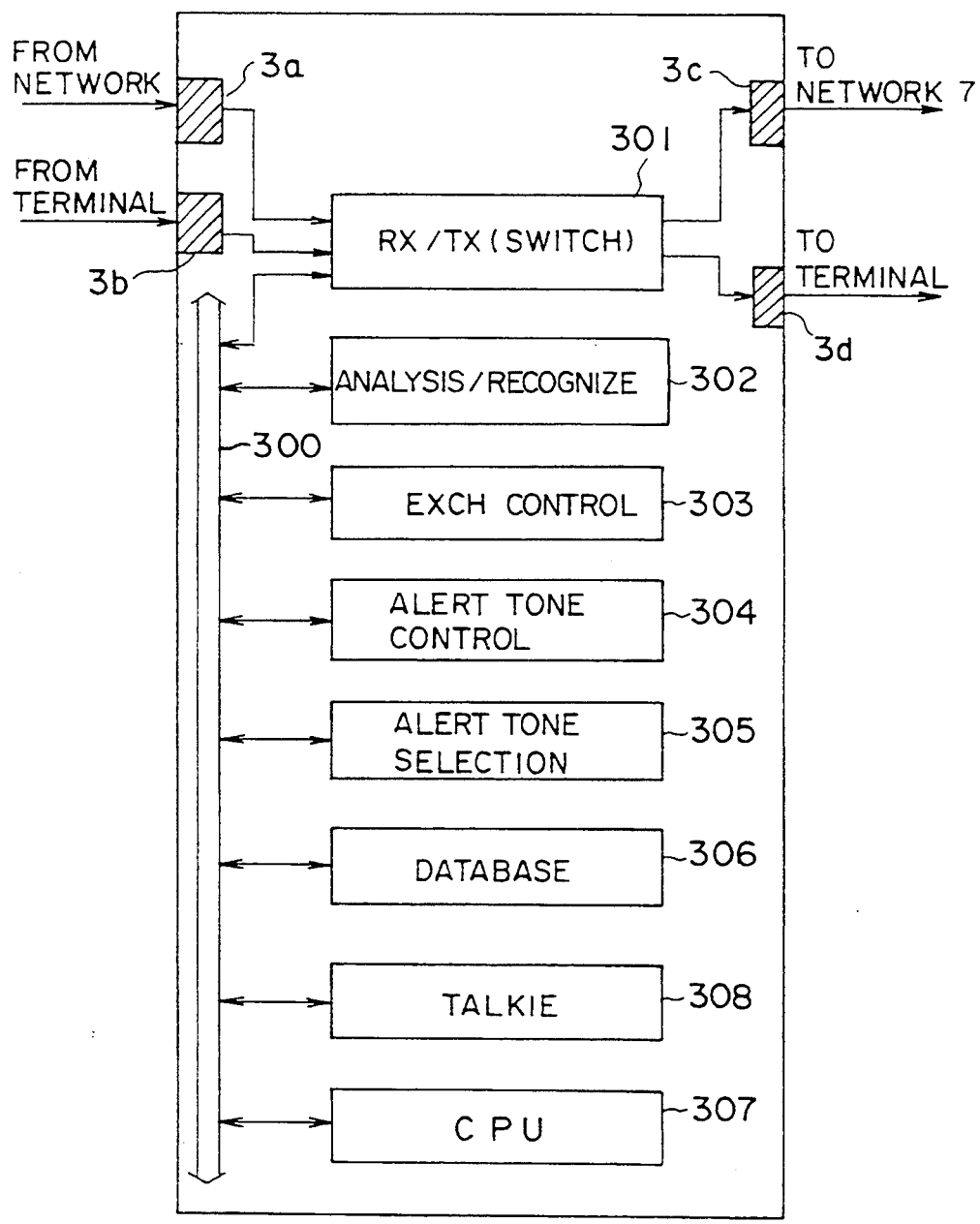
FIG. 23 is a diagram illustrating a configuration of an exchange used in the eighth embodiment.

The operations in FIGS. 22A-22C and 23 are performed at the called exchange 4 or SCP 8. When an incoming call is detected in step C1, and, in step C2, the called terminal data is read out from a data base, the data base 306, for example (as shown in FIG 23). A determination as to whether or not the called user subscribes to the alerting tone change service is given in step C3 (FIG. 22A).

If the answer YES is arrived at step C3, step C4 is carried out, wherein a voice guidance is sent to the user at the calling terminal and the password is requested. Thereupon, the password is received in step C5, and the number of passwords registered by the user is read out in step C6. The counter is cleared in step C7, after which the reading of the counter is incremented by one in steps C8 to C11 while at the same the registered password is read out from the data base one by one. A comparison is made between the registered password and the received password in step C10.

When it is determined upon comparison that the received password matches the registered password, the alerting tone number is detected in step C12 (FIG. 22B), and the alerting pattern corresponding to the alerting tone number is read out from the data base in step C13. Further, a connection is established between the called terminal and the calling terminal in step C14, and the alerting tone corresponding to the alerting pattern is generated at the called terminal in step C15.

When the user at the called terminal is not a subscriber to the alerting tone change service, the determination in step C3 results in an answer NO, and the normal alerting pattern is specified in step C16. When it is determined in step C10 that the received password and the registered password do not match, step C17 (FIG. 22C) is carried out, wherein the calling terminal is connected to a talkie unit provided in an exchange or SCP. The calling user is notified, in the form of audio information, in step C18 that the passwords failed to match.

FIG. 23 illustrates a configuration of the exchange or SCP 8 used in the eighth embodiment. While the devices in FIG. 23 have essentially the same configuration as the apparatuses in FIG. 2, the devices in FIG. 23 are unique in that they are provided with a talkie unit 308. Of course, this talkie unit 308 is used for the transmission of the voice guidance in the above-mentioned step C4 or the audio information in step C18.

The present inventions is not limited to those embodiments described above, but various variations and modifications may be made without departing from the scope of the present invention.

What is claimed is:

1. A telecommunication system comprising:
   a network for transmitting calls,
   a plurality of terminals connected to said network for communicating to each other via said network and including terminals at a calling side and terminals at a reception side, and
   a reception side switching station, connected to said network and to a terminal of said plurality of terminals, located at the reception side for receiving a call from a terminal at the calling side, transmitted via said network, and directing said call to said terminal at the reception side;
   said reception side switching station including:
   data base means including a plurality of storage areas corresponding to said terminals at the reception side, wherein each of said plurality of storage areas stores a plurality of alerting tone patterns, alerting tone selection means supplied with information, received from the terminal at the calling side, for identifying said terminal at the reception side, said information including alerting tone pattern data indicative of an alert tone pattern to be transmitted to and activated at said terminal at the reception side, and alerting tone control means for controlling said terminal at the reception side on the basis of said alert tone pattern and generating a corresponding alerting tone at the terminal at the reception side.

2. A telecommunication system as claimed in claim 1, and comprising a plurality of exchanges each connected between a respective one of said plurality of terminals and said network and each including said switching station including said data base means and said alerting tone selection means.

3. A telecommunication system as claimed in claim 2, wherein a calling terminal is connected to a calling exchange and a called terminal is connected to a receiving exchange and wherein said control means extracts, when there is a call incoming from the calling exchange to the receiving exchange, alerting tone specifying information for specifying an alerting tone, from the information contained in said call received at said receiving exchange, said control means further reading, from of said data base provided in the same exchange as said control means, an alerting pattern on the basis of said alerting tone specifying information.

4. A telecommunication system as claimed in claim 3, wherein said control means extracts, from the information contained in said call, alerting tone change instruction information for instructing an alerting tone change and extracts said alerting tone specifying information on the basis of said alerting tone change instruction information.

5. A telecommunication system as claimed in claim 3 wherein said control means extracts a password from the information contained in said call, reads a corresponding registered password from said data base, and allows a change of said alerting tone only when the extracted password matches said registered password.

6. A telecommunication system as claimed in claim 5, wherein each exchange includes voice message sending means for sending a voice message urging a user to input said password and alerting tone specifying information.

7. A telecommunication system as claimed in claim 2, wherein a calling terminal is connected to a calling exchange and a called terminal is connected to a receiving exchange and wherein when there is a call incoming from the calling terminal to the receiving exchange, said control means provided in said calling exchange extracts, from said incoming call, alerting tone change instruction information for instructing an alerting tone change of the called terminal, extracts, on the basis of said alerting tone change instruction information, alerting tone specifying information for specifying an alerting call pattern of the called terminal, and transmits the extracted alerting tone specifying information, together with a terminal number of the called terminal, to the called receiving exchange to which the called terminal is connected, and said control means of said switching station of the called terminal reads, on the basis of alerting tone specifying information, said specified tone pattern from the data base means provided in said switching station of said called terminal.

8. A telecommunication system as claimed in claim 7, wherein said control means further extracts, from the information contained in said call, alerting tone change instruction information for instructing an alerting tone change, and extracts said alerting tone specifying information on the basis of said alerting tone change instruction information.

9. A telecommunication system as claimed in claim 7 wherein said control means extracts a password from the information contained in said call, reads a corresponding registered password from said data base, and allows a change of said alerting tone only when the extracted password matches said registered password.

10. A telecommunication system as claimed in claim 9, wherein each exchange includes voice message sending means for sending a voice message urging a user to input said password and alerting tone specifying information.

11. A telecommunication system as claimed in claim 7, wherein said receiving exchange transfers said incoming call to a different terminal connected to a different exchange, when said called terminal does not cause a transition to the offhook state, together with said alerting tone specifying information.

12. A telecommunication system as claimed in claim 7, wherein said receiving exchange causes a transfer of said incoming call to a different terminal connected to a different exchange, based upon a command from the called terminal which is connected to said receiving exchange.

13. A telecommunication system as claimed in claim 1, wherein said network is provided with a network service control means, provided commonly to all the terminals that are connected to said network, for storing information about the subscribed service for each of said terminals and for controlling a service to be provided to said terminals, said alerting tone selection means and said data base means being provided in said network service control means.

14. A telecommunication system as claimed in claim 13, wherein said plurality of terminals connected to said network are divided into a plurality of groups each including one or more terminals, said data base means storing alerting tone patterns allocated to each of said groups.

15. A telecommunication system as claimed in claim 14, wherein said network has a function of addressing a called terminal from a calling terminal based upon an extension number and by converting the extension number to a line wire number.

16. A switching station for a telecommunication system having a network and a plurality of terminals and being adapted for connection to the network and to said plurality of terminals for receiving a call from a calling terminal via said network and directing said call to a destination terminal of said plurality of terminals;

the switching station comprising:

data base means including a plurality of storage areas corresponding to said plurality of terminals, wherein each of said plurality of storage areas stores a plurality of alerting tone patterns, alerting tone selection means supplied with information from said calling terminal, said information identifying said destination terminal and further containing alert tone data for specifying an alert tone pattern to be transmitted to and activated at said destination terminal, said alerting tone selection means reading out said alerting tone pattern specified by said alert tone data from a storage area of said data base means for said destination terminal, when there is a call incoming from said calling terminal to said destination terminal, and alerting tone control means, coupled to said alerting tone selection means, for controlling said destination terminal by said alerting tone pattern read out from said storage area and generating a corresponding alerting tone at said destination terminal.

* * * * *